US012702620B2

(12) United States Patent
Rostoker

(10) Patent No.: US 12,702,620 B2
(45) Date of Patent: Aug. 11, 2026

(54) COLD PLUNGE POOL SYSTEMS AND METHODS

(71) Applicant: Alejandro Rostoker, Hallandale, FL (US)

(72) Inventor: Alejandro Rostoker, Hallandale, FL (US)

( * ) Notice: Subject to any disclaimer, the term of this patent is extended or adjusted under 35 U.S.C. 154(b) by 3 days.

(21) Appl. No.: 18/658,984

(22) Filed: May 8, 2024

(65) Prior Publication Data

US 2024/0374473 A1 Nov. 14, 2024

Related U.S. Application Data

(60) Provisional application No. 63/500,911, filed on May 8, 2023.

(51) Int. Cl.
*A61H 33/00* (2006.01)

(52) U.S. Cl.
CPC ..... *A61H 33/0087* (2013.01); *A61H 33/0095* (2013.01)

(58) Field of Classification Search
CPC ........................ A61H 33/0087; A61H 33/0095
USPC ... 4/538, 488, 619, 668, 670, 671, 675, 679, 4/695, 696; 52/34
See application file for complete search history.

(56) References Cited

U.S. PATENT DOCUMENTS

| | | | | |
|---|---|---|---|---|
| 3,943,580 A * | 3/1976 | Carter | A61H 33/02 4/492 |
| 4,322,297 A * | 3/1982 | Bajka | B01D 37/04 210/138 |
| 9,995,049 B2 * | 6/2018 | Ferriss | A63B 69/125 |
| 11,720,085 B2 * | 8/2023 | Roy | G01K 3/005 700/275 |
| 2008/0010736 A1 * | 1/2008 | Hubbard | E04H 4/129 4/493 |
| 2019/0070070 A1 * | 3/2019 | Mulcahy | A61H 33/0095 |
| 2022/0125677 A1 * | 4/2022 | Doan | E04H 4/14 |
| 2025/0198185 A1 * | 6/2025 | Bauckman | E04H 4/129 |
| 2025/0262121 A1 * | 8/2025 | Elliott | A61H 33/066 |

FOREIGN PATENT DOCUMENTS

| | | | | |
|---|---|---|---|---|
| AT | 17562 U1 * | 7/2022 | E04H 4/1209 |
| CN | 104294801 A * | 1/2015 | E02B 8/06 |
| CN | 209114917 U * | 7/2019 | B01D 21/24 |
| CN | 120029392 A * | 5/2025 | G05D 27/02 |
| DE | 202021101552 U1 * | 4/2021 | E04H 4/1209 |
| EP | 0200112 A2 * | 11/1986 | E04H 4/1209 |
| KR | 20110006069 A * | 1/2011 | A47K 3/10 |
| KR | 102239253 B1 * | 4/2021 | B60H 1/00885 |
| PL | 242588 B1 * | 3/2023 | G05D 27/02 |
| RU | 2017125371 A * | 1/2019 | B01D 21/24 |
| WO | WO-2016100784 A1 * | 6/2016 | C02F 1/04 |
| WO | WO-2019083466 A1 * | 5/2019 | A63B 69/0093 |
| WO | WO-2022023826 A1 * | 2/2022 | B01D 29/114 |
| WO | WO-2025120602 A1 * | 6/2025 | G05D 7/0688 |

* cited by examiner

*Primary Examiner* — Lori L Baker
(74) *Attorney, Agent, or Firm* — Diana Mederos

(57) ABSTRACT

A modular cold plunge pool system having a reservoir with an inlet and outlet connected to an external circulation system for filtering and regulating the reservoir liquid. A separate filter and a separate thermodynamic regulator device are connected via an insulated pipe system and further connected to the reservoir inlet and outlet.

5 Claims, 5 Drawing Sheets

COLD PLUNGE POOL SYSTEMS AND METHODS

CROSS REFERENCE TO RELATED APPLICATION

This application claims priority to US provisional application entitled the same, filed on May 8, 2023, as application No. 63/500,911, the entire contents of which are incorporated herein by reference.

FIELD OF THE DISCLOSURE

The present disclosure relates to plunge pool structures with plumbing, thermodynamic, and filtration systems. More specifically, the disclosure pertains to an efficient plunge pool having an independent configuration for consumer use in home settings or for light commercial use in health clubs and spas.

BACKGROUND OF THE DISCLOSURE

Plunge pools are reservoirs or bathtub-like structures typically filled with water and ice. Athletes traditionally used plunge pools after strenuous exercise to reduce inflammation, prevent muscle injury, and to aid in muscle recovery. Ice plunges are a cultural mainstay in many northern cultures such as in Finland where people use ice plunges as part of a health ritual. For example, between sauna sessions, it is common to "shock" the body by enjoying an ice plunge either in a plunge pool or in outdoor lakes. Anecdotal evidence shows ice plunge-sauna cycles increase circulation, improve mental health, and supports the immune system.

However, more recently, plunge pools have become desired features in one's own home. It is common to fill a bathtub with water and ice or a trough in a backyard with water and ice. However, the plunge pool liquid does not maintain the recommended temperature for enough time. It is recommended that ice plunge liquid have a temperature between 9 and 16 degrees Celsius and that a person spends between 5 and 10 minutes in the plunge pool.

Traditional ice baths are also more difficult for regulating the temperature to maintain a liquid temperature in the desired range. Traditional ice baths are also inconvenient and not practical for use by multiple people either contemporaneously or consecutively due to lack of water circulation, filtration, and regulated heat removal.

Some plunge pools, both consumer and commercial grade, may be equipped with pump, cooling, and circulation plumbing. However, these systems are prone to leaks, equipment failure, hose clogging, and inefficient heat removal. Some consumer-grade in-home plunge pool systems also have complicated circulation, pump, and plumbing systems that are difficult or inconvenient to assemble, disassemble, replace, and repair. Furthermore, traditional systems result in condensation on many tube or pipe components which is problematic in indoor plunge pool systems because it can promote mold growth and corrosion of metallic parts.

SUMMARY OF THE DISCLOSURE

What is needed is a cold plunge pool system having improved cooling efficiency, reduced condensation on plumbing components, improved durability, and modularity for ease of installation and repair.

In one embodiment, the plunge pool system has a reservoir with inlet and outlet ports for connecting pumps, filters, thermodynamic regulators, and the associated pipes. A thermodynamic regulator such as a compressor-based cooling apparatus is controlled by a control panel having a processor and operably configured software in wireless communication with a server and with a user smart device having a processor and operably configured software.

In an alternative embodiment, a system contains a thermodynamic regulator with a pump connected to a separate filter.

In another alternative, a system contains separately a pump, a filter, and a thermodynamic regulator.

BRIEF DESCRIPTION OF THE DRAWINGS

The accompanying drawings that are incorporated in and constitute a part of this specification illustrate several embodiments of the disclosure. Together with the description, they serve to explain the principles of the disclosure.

NUMERALS OF THE FIGURES

Figure 1:
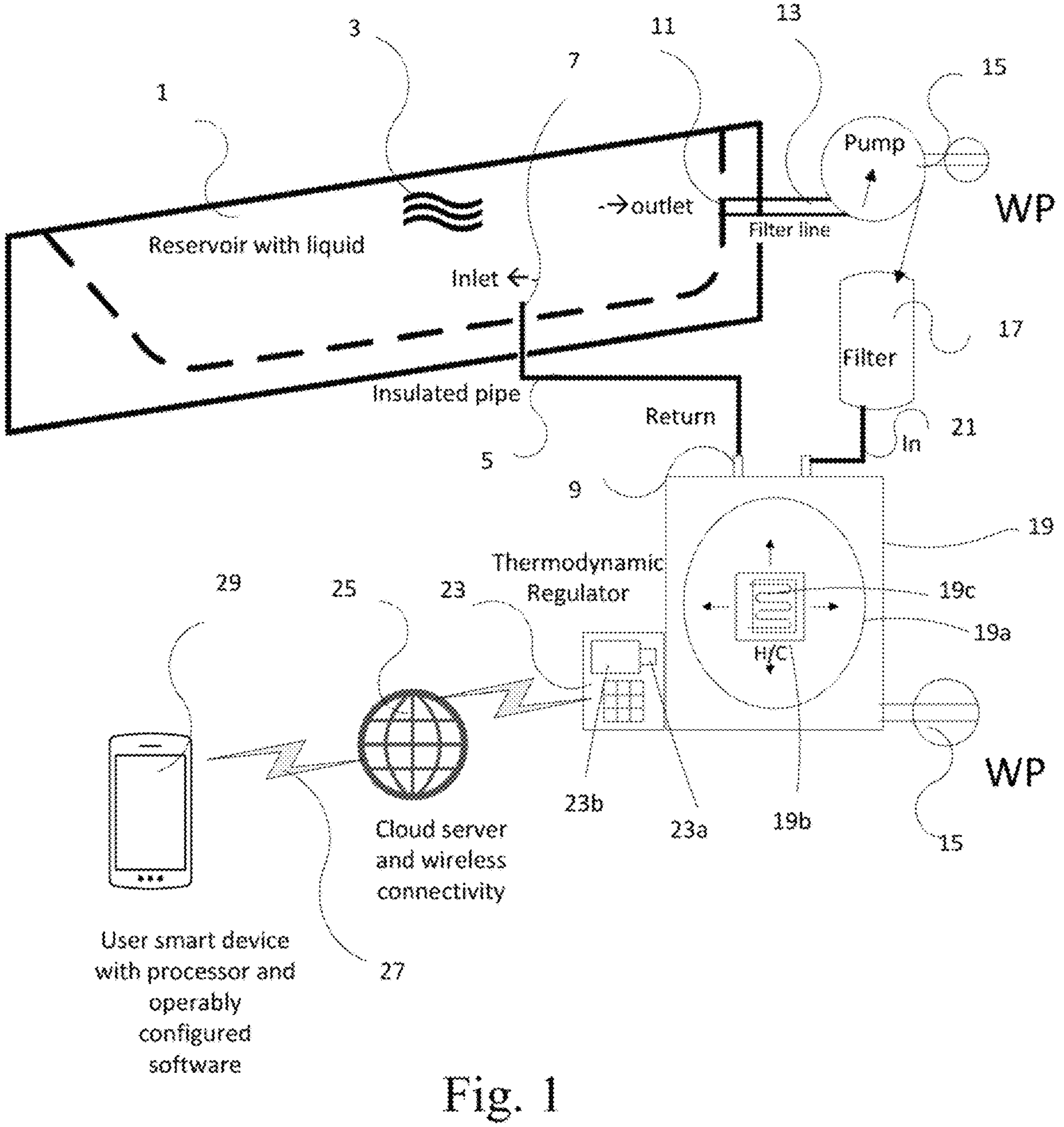
FIG. 1 illustrates an exemplary cold plunge system having an external pump, an external filter, and an external thermodynamic regulator.

1. Reservoir
3. Liquid
5. Insulated pipe
7. Inlet port
9. Return line
11. Outlet port
13. Filter line
15. Pump
17. Filter
18. Particulate matter sensor
19. Thermodynamic regulator device
19*a* Compressor
19*b* Condenser
19*c* Evaporator
20. Temperature sensor
21. In-line pipe
23. Control panel with processor and operably configured software and wireless receiver
23*a* Processor
23*b* Software module
25. Cloud server
27. Wireless connection
29. User smart device with processor and operably configured software and wireless receiver
31. First pipe
33. Second pipe
34 First joint
35. Third pipe
36 Second joint
37. Fourth pipe
39 Fifth pipe
41. Ozonation device

43. Ozone tubing
45. Ozone generator
47. Venturi pipe

DETAILED DESCRIPTION

The present disclosure provides generally for a cold plunge system having improved thermodynamics, liquid temperature regulation, and ease of assembly and repair. Exemplary systems are modular and generally comprise a reservoir having at least one inlet and at least one outlet. Pipes connect to and from the reservoir inlet and outlet to uptake reservoir liquid, filter the liquid, and circulate the liquid through a thermodynamic regulator via an expansion valve where the liquid enters an evaporator that absorbs heat from the circulating reservoir liquid. Insulated pipe systems reduce condensation to reduce mold growth and corrosion of metallic parts.

In the following sections, detailed descriptions of examples and methods of the disclosure will be given. The description of both preferred and alternative examples are exemplary only, and it is understood that to those skilled in the art that variations, modifications, and alterations may be apparent. It is therefore to be understood that the examples do not limit the broadness of the aspects of the underlying disclosure as defined by the claims.

DETAILED DESCRIPTIONS OF THE DRAWINGS

Referring now to FIG. 1, an exemplary cold plunge system having an external pump, an external filter, and an external thermodynamic regulator is illustrated. As shown, this exemplary embodiment contains individual circulation, filtering, and cooling components. The modularity provides improved ease of repair, replacement, and maintenance. Some plunge pool systems may have larger volumes of liquid that need to be cooled. In such cases, a system may include an additional pump to increase flow.

Figure 2:
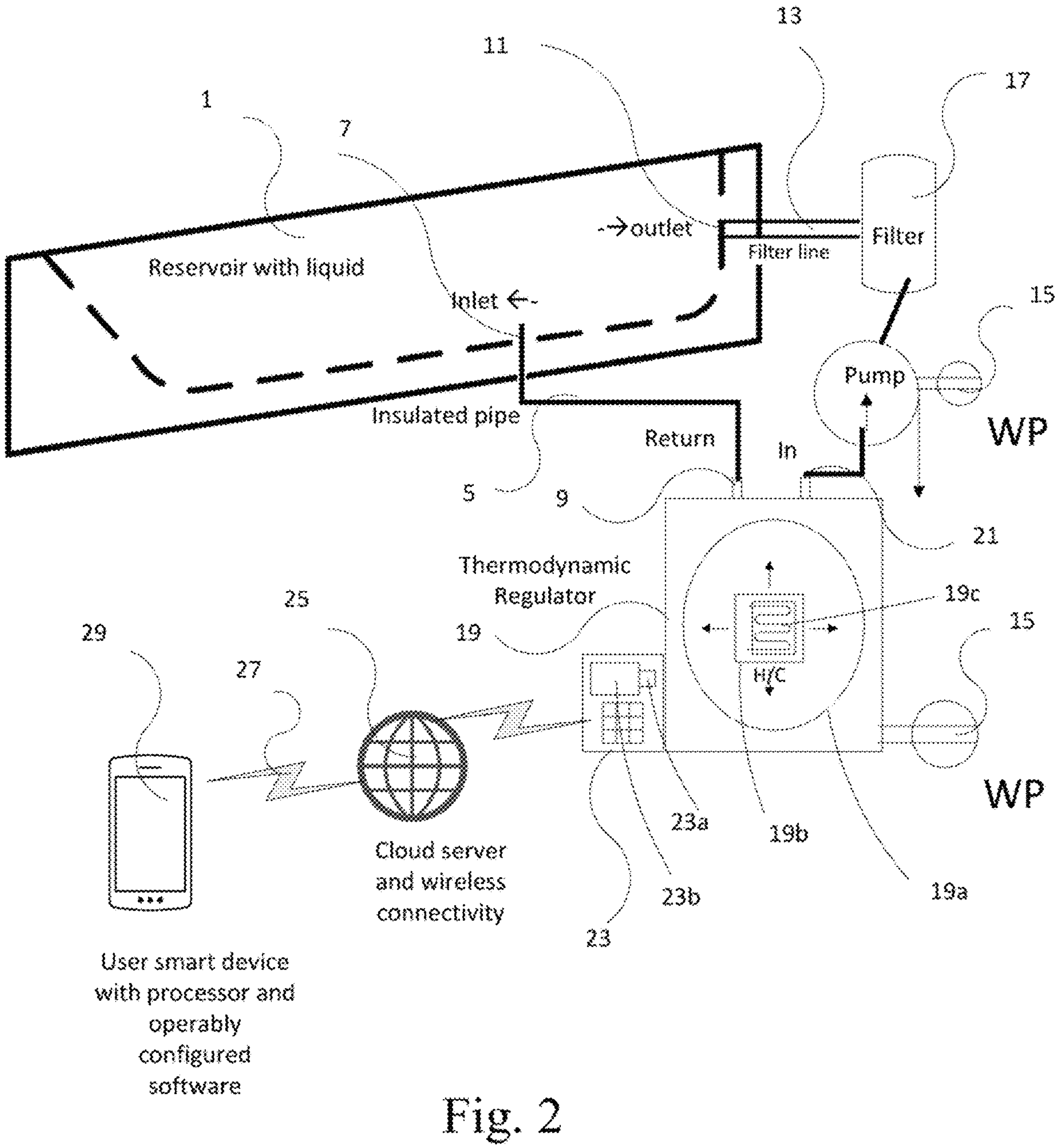
FIG. 2 illustrates an exemplary cold plunge system having an external filter, an external pump, and an external thermodynamic regulator.

Referring now to FIG. 2, an exemplary cold plunge system having an external filter, an external pump, and an external thermodynamic regulator is shown. This embodiment further demonstrates the modularity of systems of the disclosure. A pump is positioned in a sequence after a filter but before a thermodynamic regulator device.

Figure 3:
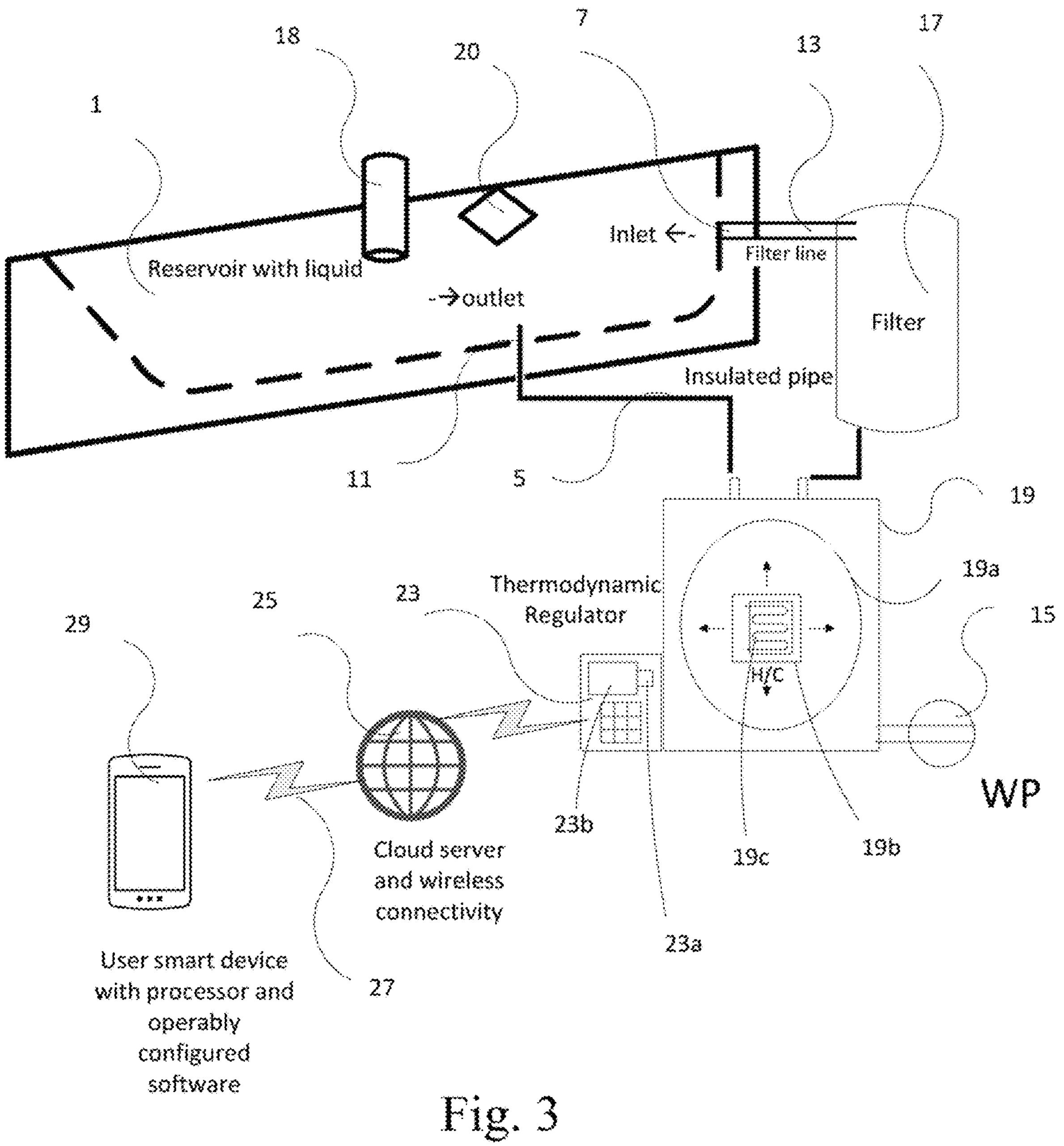
FIG. 3 illustrates an exemplary cold plunge system having an external filter and an external thermodynamic regulator.

Referring now to FIG. 3, an exemplary cold plunge system having an external filter and an external thermodynamic regulator is illustrated. In this preferred example, liquid flows between the reservoir, filter, and thermodynamic regulator in a simplified and preferred arrangement. However, additional components may be included for an enhanced experience. For example, lights, UV lamps, ozone generators or ozonators, scented oil diffusers, speakers, and reservoir covers may be included and integrated into the system. More specifically, sensors in communication with a control panel are used in some embodiments. Preferred sensors include temperature sensors and particulate matter or turbidity sensors. Sensor detections beyond a defined threshold may trigger the initiation of programmatic instructions sent from the control panel to a thermodynamic regulator device or to a filter or filtration device, or to a pump in connection with a thermodynamic regulator device or filter or filtration device to adjust flow rates.

Figure 4:
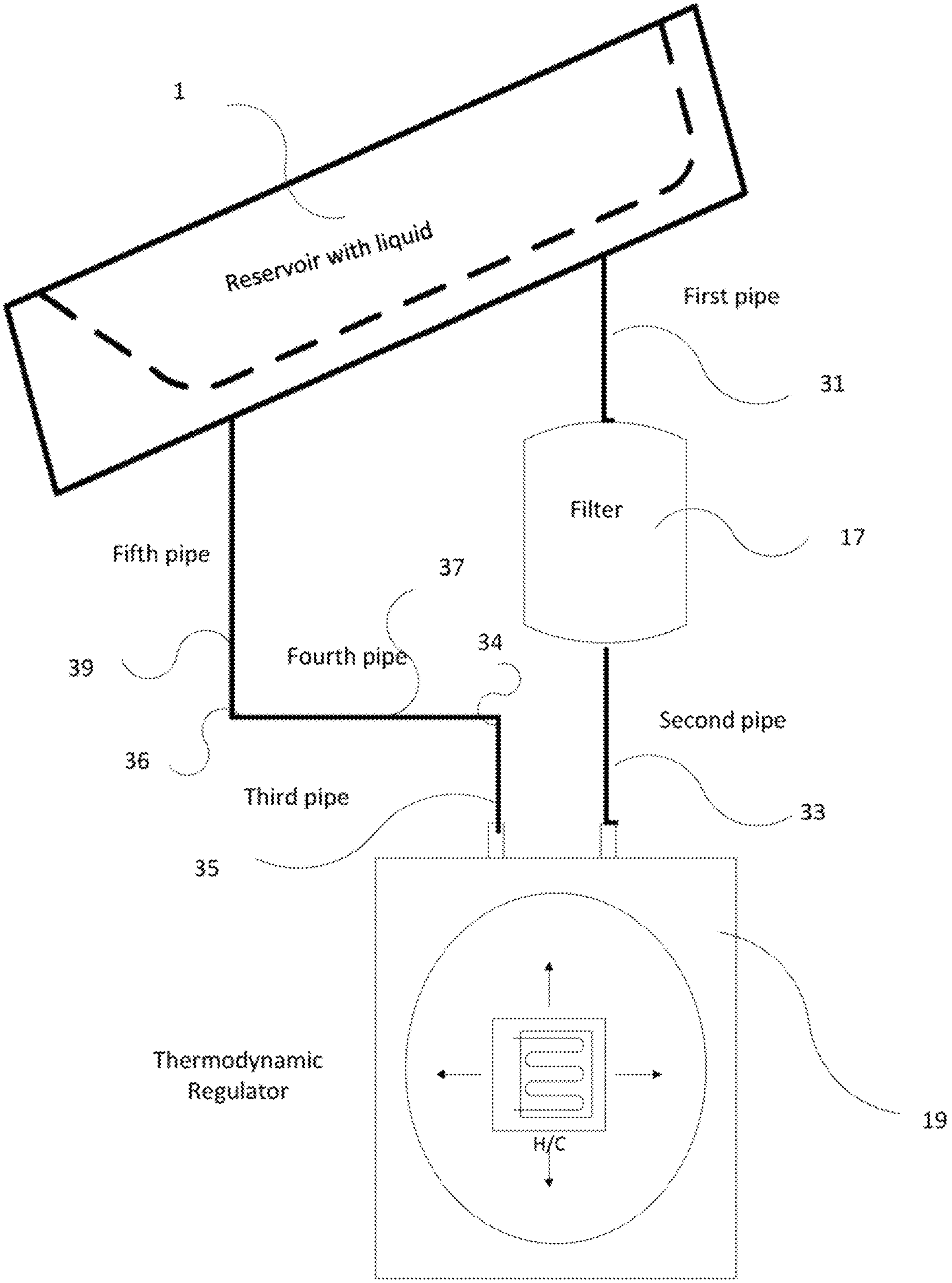
FIG. 4 illustrates an exemplary pipe configuration in a modular system.

Referring now to FIG. 4, an exemplary pipe configuration in a modular system is illustrated. The modularity reduces repair and maintenance costs. Assembly and disassembly are also consumer friendly. For example, a person can assemble and begin to use the exemplary cold plunge pools of the disclosure by obtaining a reservoir, connecting a first pipe to a reservoir outlet and connecting a filter inlet to a first pipe. A person then connects a second pipe to a filter outlet and connects a thermodynamic regulator inlet to the second pipe. Then, one may connect a third pipe to the thermodynamic regulator outlet, connect a first joint to the third pipe, connect a fourth pipe to the first joint, connect a second joint to the fourth pipe, connect a fifth pipe to the second joint, and connect the fifth pipe to a reservoir inlet.

A person may begin filling a reservoir with a liquid and initiate a pump to circulate the reservoir liquid through the cold plunge pool system and may control temperature and flow preferences via a control panel. The temperature is substantially the same over a period of time. For example, the liquid temperature is maintained within a 3-degree Celsius range of an initial set temperature over a time period ranging from 5 minutes to 5 hours. The initial set temperature is determined by selecting a temperature on the control panel and is preferably between and including 4 to 18 degrees Celsius. In an exemplary system, the liquid in the reservoir maintains a temperature of +/−7 degrees Celsius. The control panel programmatically instructs the thermodynamic regulator device and pump together or only at least one pump or a plurality of pumps to increase, decrease, or stabilize the flow rates.

Figure 5:
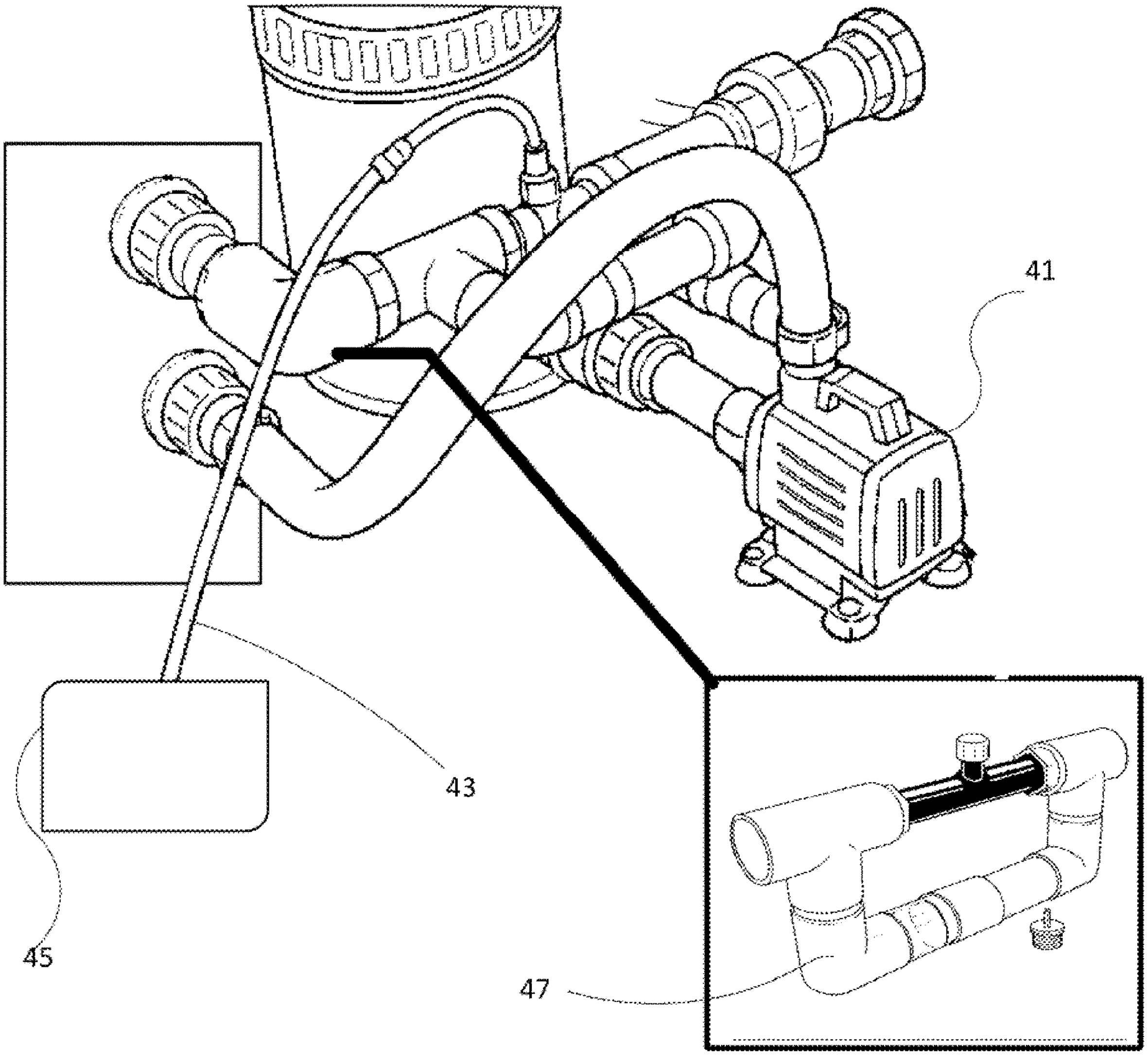
FIG. 5 illustrates an exemplary system having an ozonator device.

Referring now to FIG. 5, an exemplary system is shown having an ozonation device and associated ozone tubing, ozone generator, and venturi pipe. In preferred embodiments, the venturi pipe is positioned sequentially after the thermodynamic regulator and contains a constricted inner surface causing a Venturi effect, the reduction in fluid pressure and increase in velocity as the fluid passes through the constricted inner surface. The negative pressure aspirates ozone from an ozone generator via a tube connected to a port in the center of the venturi pipe. Ozonated fluid exits the venturi pipe at a greater pressure but at a lower velocity.

CONCLUSION

A number of embodiments of the present disclosure have been described. While this specification contains many specific implementation details, these details should not be construed as limitations on the scope of any disclosures or of what may be claimed.

Certain features that are described in this specification in the context of separate embodiments can also be implemented in combination in a single embodiment. Conversely, various features that are described in the context of a single embodiment can also be implemented in combination in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

As used herein, words of approximation such as "about," "around," and "approximately" refer to conditions that when so modified are understood to not necessarily be absolute or perfect but are considered close enough to those of ordinary skill in the art. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as “about” may vary from the stated value by ±1, 2, 3, 4, 5, 6, 7, 8, 9, or 10 percent.

Thus, particular embodiments of the subject matter have been described. Other embodiments are within the scope of the following claims. In some cases, the actions recited in the claims can be performed in a different order and still achieve desirable results. Nevertheless, it will be understood that various modifications may be made without departing from the spirit and scope of the claimed disclosure.

What is claimed is:

1. A cold plunge system, the system comprising a reservoir having an inlet and an outlet, wherein the inlet and outlet are connected to an external sequential plumbing system having a filter and a thermodynamic regulator device connected via an insulated pipe system.

2. The cold plunge system of claim 1 wherein the thermodynamic regulator is compressor based with an evaporator and a condenser.

3. The cold plunge system of claim 1 further comprising a control panel with processor and operably configured software.

4. The cold plunge system of claim 1 wherein the insulated pipe system comprises a configuration of five pipes connected via ports and joints.

5. A method of maintaining liquid temperature of a cold plunge pool, the method steps comprising:

obtaining a reservoir, connecting a first pipe to a reservoir outlet, connecting a filter inlet to a first pipe, connecting a second pipe to a filter outlet, connecting a thermodynamic regulator inlet to the second pipe, connecting a third pipe to the thermodynamic regulator outlet, connecting a first joint to the third pipe, connecting a fourth pipe to the first joint, connecting a second joint to the fourth pipe, connecting a fifth pipe to the second joint, connecting the fifth pipe to a reservoir inlet, filling a reservoir with a liquid, and initiating a pump to circulate the reservoir liquid through the cold plunge pool system at a substantially constant temperature.

* * * * *